June 20, 1933.   L. L. KUEMPEL   1,914,435
HEAT REGULATING DEVICE
Filed Feb. 7, 1931   3 Sheets-Sheet 2

Inventor
LEON L. KUEMPEL

ATTORNEYS

June 20, 1933. L. L. KUEMPEL 1,914,435
HEAT REGULATING DEVICE
Filed Feb. 7, 1931 3 Sheets-Sheet 3
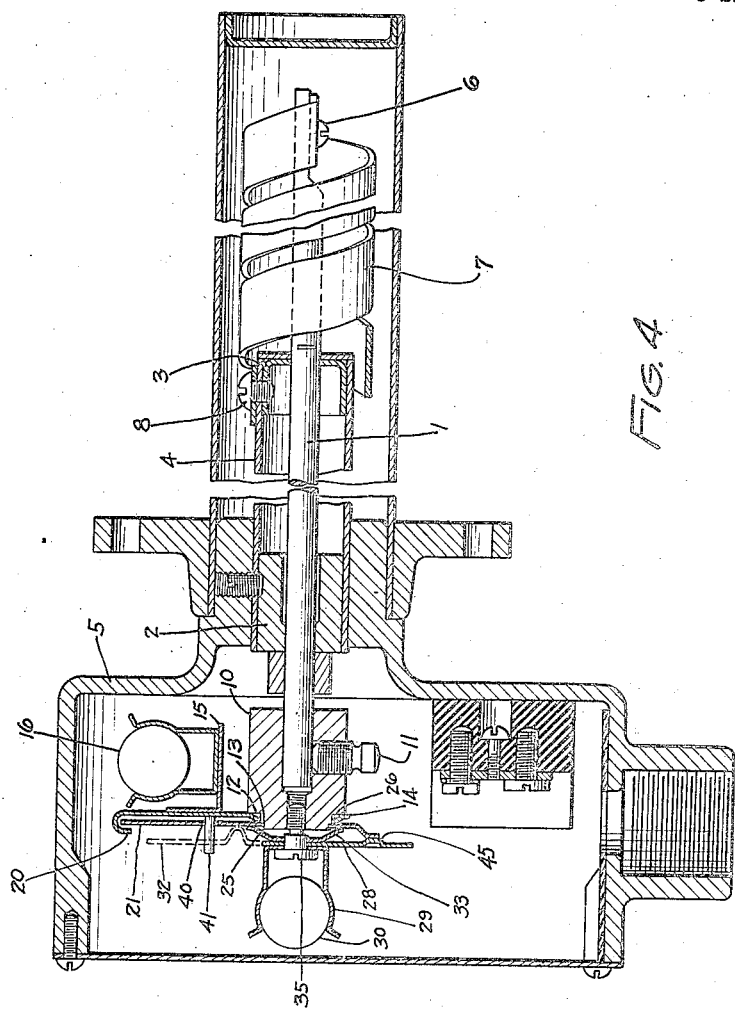
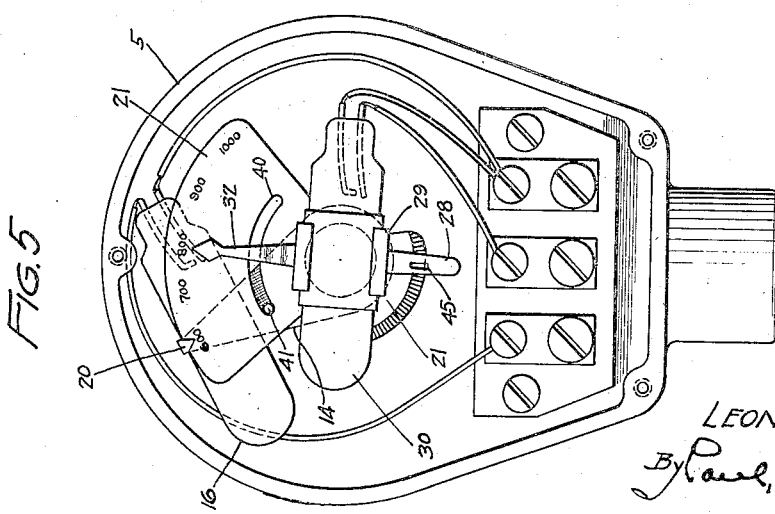
Inventor
LEON L. KUEMPEL
ATTORNEYS Patented June 20, 1933

1,914,435

UNITED STATES PATENT OFFICE

LEON L. KUEMPEL, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

HEAT REGULATING DEVICE

Application filed February 7, 1931. Serial No. 514,172.

This invention relates to improvements in heat regulating devices, and the invention has found valuable application in the control of stoker apparatus in which apparatus it is, of course, desirable to unfailingly maintain the temperature of the fuel above the combustion point, and to limit the rise in temperature of the fire to some predetermined maximum temperature. It is one of the objects of this invention to provide a control which has a plurality of switches all of which are operable by thermal means which is responsive to heat production, and also specifically to operate the switches as the result of temperature changes in the stack of a furnace or like device.

I am aware that others have tried to provide a simple and efficient device for operating stokers and other means for initiating heat production, but in all the systems known to me expensive constructions, including motors, draft fans, dampers, etc., are necessary. Moreover, in certain other devices where a by-pass damper is used to reduce the temperature of the stoker switch and in which forced or natural draft is used, there is a variation in draft when the by-pass damper is opened so that the control is not always prompt, nor accurate. In these other systems, if contacts are dirty or if there is faulty wiring, the by-pass damper may remain permanently open causing a large amount of over-heating.

Among the objects of the invention are: to provide a very cheap and efficient device by means of which heat production is controlled either independently by all of a plurality of switches, or independently by one or more switches; to use a pair of switches which are responsive to heat production; to have these switches sequentially close on fall of temperature; to provide electrical connections adapted to independently control heat production when both switches are closed, and further adapted to independently control heat production by means of that one of the pair of switches which is first to close on fall of temperature; to provide means whereby a thermostat can be used in conjunction with the switches to control the heating apparatus for production of heat when the stack temperature is below some predetermined high temperature; to provide in combination with a room thermostat electrical connections by which the control of heat production is dominated by switches other than the room thermostat when stack temperature falls below a predetermined minimum; to provide such a control which includes the stack controlled switches, a relay for controlling the circuit through one of them and a room thermostat for controlling the relay; to provide systems in which all switches may be in a high voltage circuit; to provide systems in which all the switches, with the exception of the main high voltage switch operate on low voltage; to provide systems in which the stack temperature control switches are in the high voltage circuit, and the thermostat and relay in a low voltage circuit; and to provide embodiments of the invention, which have a large range of uses.

Objects, features and advantages of the invention will be set forth in the description of the drawings forming a part of this application, and in said drawings Figure 1 is a diagram showing the invention applied to a furnace including a motor as an electrically operable means for initiating heat production, and showing all switch devices in a high voltage circuit;

Figure 4 is a longitudinal section through the thermostat; and

Figure 5 is a face view showing the relations of the tubes, the parts being positioned as when the temperature is sufficiently high to close the high limit switch.

Figure 1:
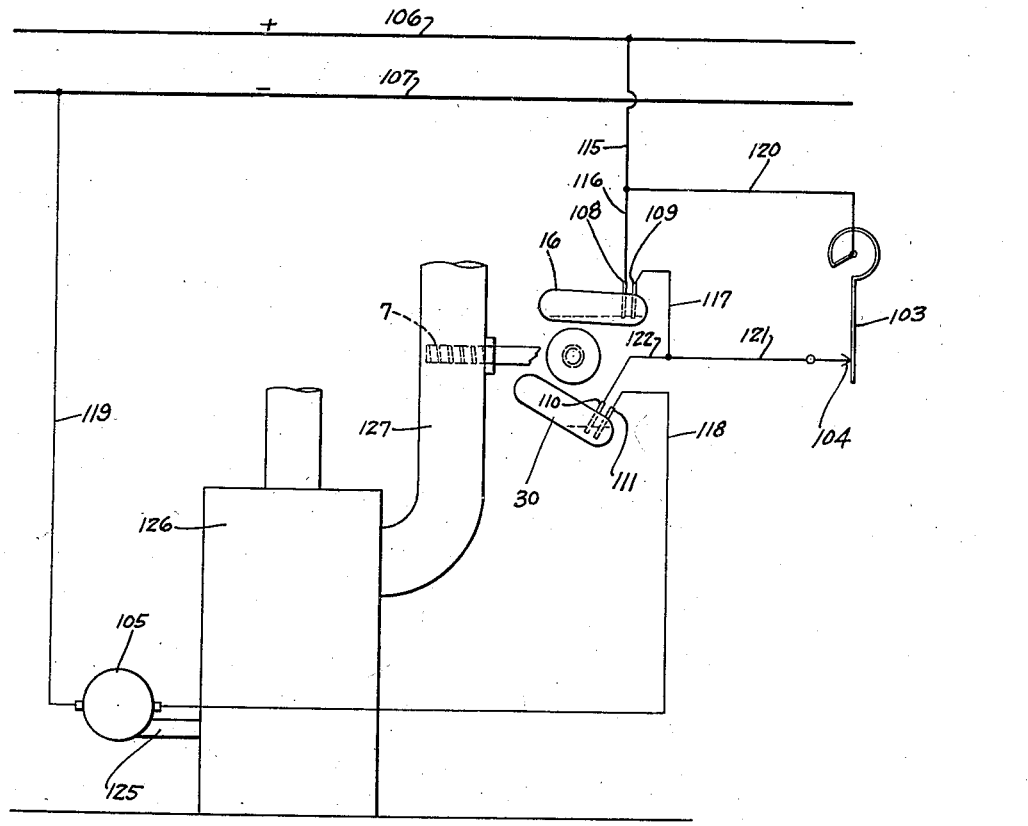

One form of stack thermostat is shown in Figures 4 and 5, and comprises a shaft 1 rotatable in suitable bearings 2, 3, arranged in the tube 4, suitably mounted in housing 5. The shaft projects from opposite ends of the tube. At one projecting end is attached, as at 6, one end of a helical thermal element 7 which has its opposite end attached as at 8 to the tube 4. The application of heat to this helical element rotates the shaft in the usual manner. Carried by the projecting opposite end of this shaft is a head 10 secured to shaft 1 by a set screw 11. This head is counter-turned to provide two shoulders 12, 13. On one counter-turned portion and against shoulder 12 is arranged a tube support 14 having a bracket 15. A mercury tube switch 16 is mounted on the bracket. This support has a pointer 20 which passes over the top of a dial plate 21 to lie in opposition to the numbers on the dial face, see Figure 5. This dial plate is immovably mounted upon the second counter-turned portion against the shoulder 13, and is secured as by peening at 25, and the rear face of the dial plate presses against a bulged-out resilient portion 26 of the tube support 14 so that this support is frictionally held between the dial plate and the shoulder 12, for angular adjustment to correspondingly angularly adjust the tube 16. At the opposite side of the dial plate is mounted a second tube support 28 carrying a bracket 29, having tube 30 thereon. This support also has a pointer 32 opposed to the face of the dial. Between this support and the end of the block is interposed a spring friction device 33 which has portions respectively engaging the front face of the dial plate and the rear face of the tube support 29. The friction device is put under compression by screw 35 which passes through bracket 29, plate 28, and friction device 33 and has threaded engagement with the block 10. This screw forms a journal about which tube support 29 and tube 30 are angularly adjustable. Thus the tube supports lie at opposite sides of the dial plate and have pointers which oppose graduations of the dial, and the supports can be adjusted relative to one another, to bring the long axes of the tubes into the desired angular relations. In this embodiment, it is the object to have the switches sequentially close on a fall of temperature and to prevent such angular adjustment as will permit the high limit switch 30 to open at a temperature below that for which the low limit switch 16 is set to open. This for the reason that, as more fully herebelow explained, it is desired always to have both switches closed, when the low limit temperature is reached. To further this end, the dial plate 21 is arcuately slotted as at 40, and a pin 41 carried by support 14 passes loosely through this slot and projects into the rotative path or path of pointer arm 32 of tube support 28. As shown, the long axes of the tubes converge left-wards. Thus in this instance, the long axes of the tubes cannot assume a parallel relation, nor can they be so adjusted as to converge right-wards. Nevertheless, the angle of convergence to the left may be increased. The long axes of the tubes may be so disposed with reference to the horizontal plane, that a certain amount of movement of the thermostat, and consequent rotation of the shaft 1, may bring one of the switches to open circuit position while the other remains in circuit closed position. The support 28 has a projection 45 which adjustably engages an arcuate row of teeth on the dial plate, whereby the support is more positively held in adjusted position. It will also be understood that the stack, or other thermostat may be of any preferred form, the device illustrated herein being one of the many forms which could be utilized to have stack temperature control high limit and low limit switches.

In the embodiment of Figure 1, all the switches, including the room thermostat, are in the high voltage circuit, and the room thermostat or control switch is of the simplest type.

Now referring to Figure 1: The device 105 represents any suitable electrically operable means for initiating heat production, and is herein associated with furnace 126, although a valuable use is in conjunction with a stoker mechanism. Numeral 126 may indicate any mechanism for supplying fuel and/or producing heat. In this instance, the device 105 is represented as a blower motor, and it delivers fuel through pipe 125 into furnace 126. The stack of the furnace is shown at 127. The operating element 7 of the stack thermostat is disposed in this stack in any suitable manner.

The low limit switch is indicated at 16 and the high limit switch at 30. As shown in the diagram, the switches are angularly related for the purpose previously explained. In this instance, the control switch is a thermostat, the movable member of which is indicated at 103 and the contact of which is indicated at 104. The main lines are indicated at 106—107. Contacts of the low limit switch 16 are indicated at 108 and 109 and the contacts of the high limit switch 30 are indicated at 110—111.

It will be assumed, for example, that both switches are closed at the temperatures below 600° and that the high limit switch 30 is opened at any temperature above 800°. Both are closed below some minimum temperature, and both are opened above some maximum temperature. Electrical means and connections are provided, and the elements of the system are so arranged that whenever the low limit switch closes (at 600°) the high limit switch is already closed, and current passes through both switches to energize the dominant motor control for supplying heat, even though the room thermostat 103, may at this time be open. Since the high limit thermostat is closed at all temperatures below 800° the heating apparatus can be operated by the room thermostat, to supply heat, when stack temperature is above a predetermined low limit, the control then being through the thermostat and high limit switch. In other words, for low limit operation, the switches 16, 30 operate in series in the motor circuit, and for high limit operation, the room thermostat and high limit switch operate in series.

*Operation—embodiment of Figure 1*

Let it be assumed that the temperature is below 600° and that, therefore, both switches are closed (see Figure 1). The motor or equivalent device is energized through the following circuit: line 106, conductor 115, conductor 116, 108, 109, conductor 117, 122, 110, 111, 118, motor 105, 119, to line 107. It is now seen that the dominant control for the motor is through a circuit in which both of said switches are in series, and it will be further noted that the motor is energized under these conditions whatever the position of the thermostatic element 103. Now let it be assumed that the temperature is somewhere between 600° and 800°. In this case, contacts 108—109 are open, and contacts 110—111 closed. On closure of the room thermostat at 103—104 the motor is energized through the high limit switch as follows, 106, 115, 120, 103, 104, 121, 122, 110, 111, 118, 105, 119 to 107. It is, therefore, seen that the room thermostat has the dominant control to initiate production of heat at any temperature below 800° but above 600°.

Under normal conditions of operation, the low limit switch will probably open and close much more frequently than the high limit switch, and for this reason is much more liable to get out of order. In the present invention, if it should happen that the electrodes of the low limit switch remained closed when they should open, the stoker, or heating plant, would only continue to be operated for heat production until the temperature reached the high limit, resulting in opening of the high limit switch, and de-energization of the motor. On the other hand, if switches 16 and 30 were not in series, the continued closure of the low limit switch under the conditions mentioned, would cause a continuous operation of the stoker or heating plant which the high limit switch could not stop, the result being serious over-heating.

Figure 3:
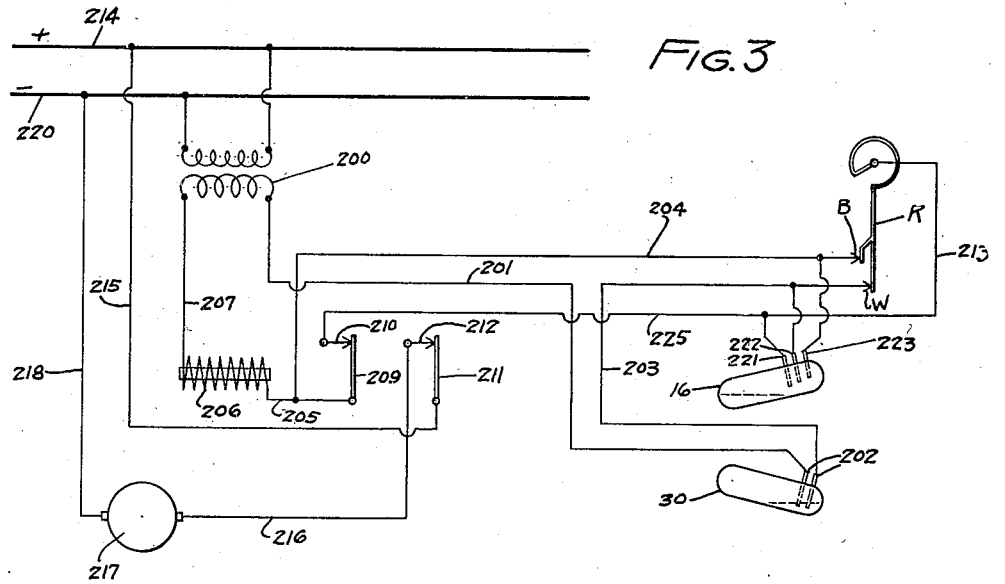
Figure 3 is another modification in which the switches are all, with one exception, in a low voltage relay circuit.
Figure 2:
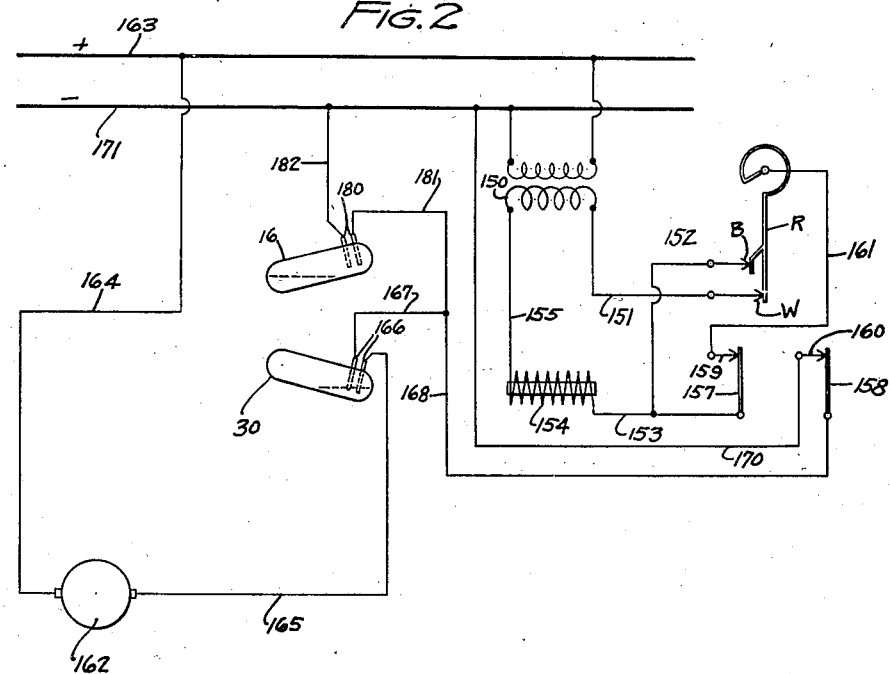
Figure 2 illustrates a modification in which the stack switches are in the high voltage circuit, with the room thermostat in a low voltage circuit and controlling a switch in the high voltage circuit by means of a relay.

Inasmuch as the various individual elements, and their functions, (as related to the broader aspects of this invention) have already been treated of by reference in detail, and inasmuch as the modified embodiments of Figures 2 and 3 are broadly the same as previously described, no separate detailed numerical reference to these elements is made except under the headings "Operation", which follow.

In Figure 2, the mercury tube switches are in the high voltage circuit and the room thermostat is in the low voltage circuit and controls a relay, which in turn controls a switch in the high voltage circuit. Also, in this embodiment of the invention, the room thermostat comprises a thermally movable switch arm sequentially engageable with two contacts which are arranged on the same side of the arm.

*Operation—embodiment of Figure 2*

Suppose the high limit switch closed and the low limit switch open, and a call for heat by the room thermostat and resultant closure of W, R, B. The relay is energized through the following circuit: transformer secondary 150, line 151, contact W, R, B, conductor 152, conductor 153, relay coil 154, conductor 155 to opposite side of the secondary of the transformer. On energization of coil 154, switch arms 157—158 close their contacts 159—160. A holding circuit for the relay 154 is also established as follows: one side of the secondary 150, 151, W, R, conductor 161, contact 159, 157, 153, 154, 155 to the opposite side of the secondary 150. The motor 162 is now energized through the following circuit: hot line 163, conductor 164, motor 162, conductor 165, contacts 166 of the high limit switch, conductor 167, conductor 168, switch 158, 160, 170 to opposite side 171 of the main line. It will be noted at this time that the contacts of the low limit, or stack, switch are open and that therefore the control for starting and stopping the heating apparatus is by means of the room thermostat through the relay 150.

Now assume that the room thermostat is either closed or open and that the temperature of the stack has fallen enough to cause contacts 180 of the low limit switch to close. At this time, the contacts 166 of the high limit switch will also be closed. The motor will now be energized through a circuit which is independent of the position of the contact 158 or of the position of the thermostatic member R. This circuit is as follows: 163, 164, 162, 165, switch contacts 166, 167, 181, 180, 182 to 171. On production of heat, the stack thermostat will cause the switches to again move, and the low limit switch will eventually assume the position shown in the figure, leaving the high limit switch contacts 166 closed. If, after the low limit switch opens its contacts 180, the room thermostat is closed the switch 158 will also be closed, and the motor will continue to operate to deliver fuel and this action will continue until a high limit temperature is reached, at which time contacts 166 are opened.

In Figure 3, the high and low limit switches, and the room thermostat, are in the voltage circuit which controls a relay, which in turn controls a switch in the high voltage circuit.

*Operation—embodiment of Figure 3*

Assume that contacts 202 of the high limit switch are closed, and that contacts 221, 222, 223 of the low limit switch are open, and assume a closure of the thermostat at W, R, B. The relay is energized through the following circuit: from one side of the secondary 200, 201, contacts 202 of the high limit switch, conductor 203, W, R, B, conductor 204, conductor 205, relay coil 206, conductor 207 to the opposite side of the secondary 200. Switch 209 closes against contact 210 and switch 211 closes against contact 212 these switches being relay-controlled. A holding circuit for the thermostat is established as follows: 200, 201, 202, 203, W, R, 213, 225, 210, 209, 205, 206, 207 to opposite side of 200. The motor circuit is energized as follows: 214, 215, 211, 212, 216, motor 217, line 218 to opposite side of main line 220. If heat is now supplied until the temperature in the stack rises sufficiently to cause the stack thermostat to open the switch contacts 202, the holding circuit for the room thermostat will be broken, and the relay de-energized and switches 209—211 opened.

Assume that this high limit temperature has been reached and that the heat supply has been interrupted, and that the room thermostat either remains closed or opens. On fall of temperature in the stack, the contacts 202 first close. If the temperature falls sufficiently, contacts 221, 222, 223 close. When the temperature reaches the low limit, the high and low limit switches assume control independently of the room thermostat as before stated in regard to the other embodiments, and a circuit for closing the relay is established as follows: 200, 201, 202, 203, 222, 223, 204, 205, 206, 207 to the opposite side of the secondary 200. A holding circuit is also established as follows: 200, 201, 202, 203, 222, 221, 225, 210, 209, 205, 206, 207 to the opposite side of the secondary 200. Electrode 221 may be dispensed with, but when it is used, the circuit should be first closed across electrodes 221 and 222, and then across electrodes 222, 223 in correspondence to the sequential closure of the contacts W, B, of the room thermostat. In each instance, the holding circuits are first to be established, and last to be broken.

The present invention is to be distinguished from fuel feed controls which prevent fuel feed in case of flame failure, and which are controlled by stack temperatures, or by devices responsive to the presence or absence of flame. Insofar as I am aware, it is broadly new in the stoker art to use thermostatic devices in the stack for stoker-motor control, and particularly to use high and low limit switches controlled by stack temperatures.

I, therefore, believe it novel (in a solid fuel furnace where it is necessary to maintain a fire at all times) to place a low limit switch so as to be directly responsive to the temperature of the products of combustion, together with a room thermostat and a high limit temperature switch also responsive to the products of combustion.

This device is of particular utility in stoker controls where provision must be made for maintaining fire in the fire box at all times. The low limit switch may be set to close at some reasonable stack temperature, for example between 100° and 200° so as to maintain fire in the fire box. When the low limit switch is open, the room thermostat may complete a stoker-motor circuit through the high limit switch, and the room thermostat is thus in command except when the stack temperature exceeds the predetermined high limit, whereupon the high limit switch assumes control, to prevent continued stoker-motor operation. Under some conditions, the boiler pressure or temperature might not become excessive due to a large load demand on the boiler, but sometimes, in order to meet this load demand, it is necessary to fire so heavily and continuously, that the stack temperature rises above the safe limit.

I claim as my invention:

1. A burner motor, a relay having a contact controlling the motor circuit, a thermostat having two contacts sequentially engageable by a thermostatic element, high and low limit switches responsive to the temperature of combustion, an electrical circuit which includes therein said high limit switch and thermostat, a second circuit which includes therein said high and low limit switches, and holding circuits which are respectively controlled by the limit switches, and by said thermostat.

2. A burner motor and relay and means by which the relay controls the motor, a room thermostat, high and low limit switches responsive to the temperature of combustion and circuits by which the relay can be energized independently of the room thermostat when both limit switches are closed, and only through the high limit switch and thermostat when the low limit switch is open, including a relay holding circuit which is active when the limit-switches are closed and which is controlled by the low limit switch.

3. A motor, a room thermostat, high and low limit switches, and means by which they are relatively angularly adjustable on a common thermostatically controlled support, means for preventing such relative angular adjustment of the switches as will allow the high limit switch to close at a lower temperature than the low limit switch, and circuits by which the motor can be energized either through both limit switches when these switches are closed, or through one of these switches and the thermostat.

4. A motor, a room thermostat, high and low limit switches angularly adjustable on a common thermostatically controlled support, means for preventing such relative angular adjustment of the switches as will allow the high limit switch to close at a lower temperature than the low limit switch, and circuits by which the motor can be energized independently of the room thermostat when both limit switches are closed, and through the high limit switch and thermostat when the low limit switch is open.

5. A motor and relay and means by which it controls the motor, a room thermostat, high and low limit switches angularly adjustable on a common thermostatically controlled support, means for preventing such relative angular adjustment of the switches as will allow the high limit switch to close at a lower temperature than the low limit switch, and circuits by which the relay can be energized independently of the room thermostat when both limit switches are closed, and through the high limit switch and thermostat when the low limit switch is open, including a holding circuit which passes through a contact of the low limit switch.

6. In a system of the class described, a burner motor, a room thermostat, a relay, thermostatically operated high and low limit switches responsive to the temperature of combustion, a circuit by which the relay controls the motor, starting and holding circuits for the relay having therein the thermostat and high limit switch only, a starting circuit for the relay having therein the high and low limit switches only, and a holding circuit for the relay having therein the high and low limit switches, and controlled by the low limit switch independently of the thermostat.

In witness whereof, I have hereunto set my hand this 31st day of January 1931.

LEON L. KUEMPEL.